May 31, 1927.
J. W. CAUSEY
1,630,468
BAND SAW AND WHEEL THEREFOR
Filed Dec. 8, 1926
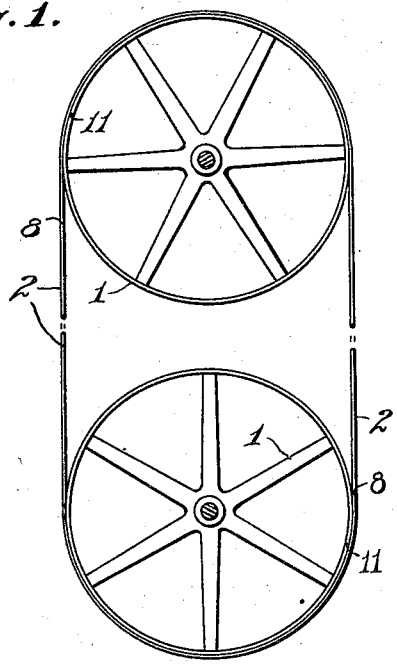
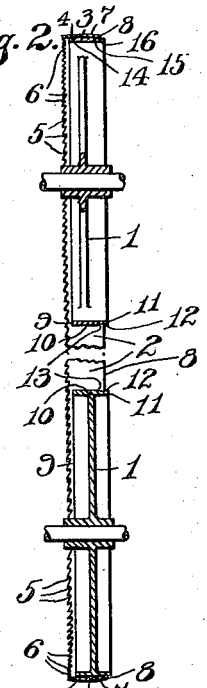
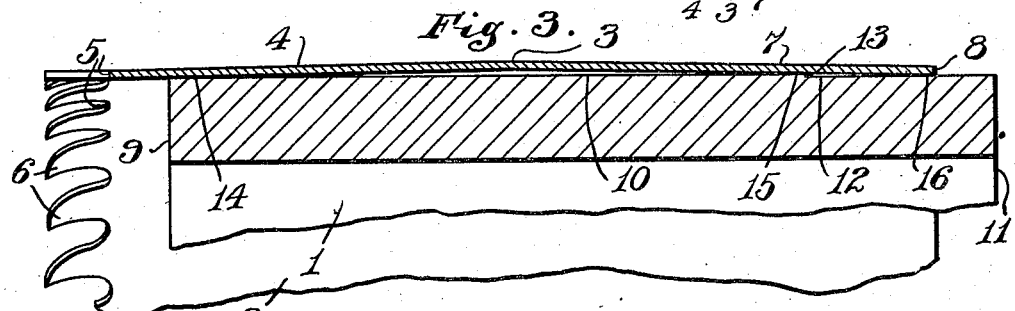
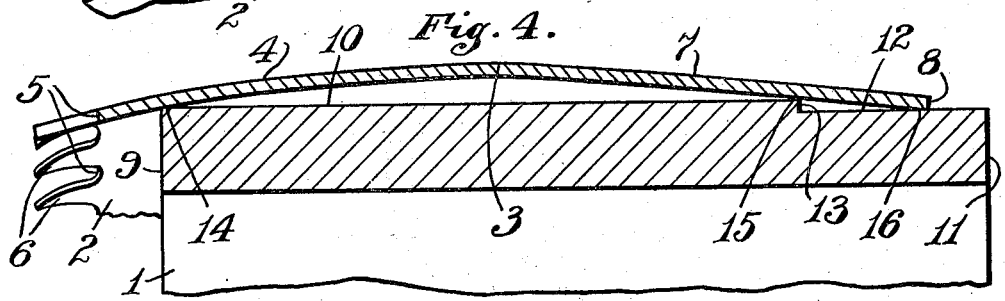
INVENTOR.
Joseph W. Causey,
BY
Hood & Hahn.
ATTORNEYS

Patented May 31, 1927. 1,630,468

UNITED STATES PATENT OFFICE.

JOSEPH WALLACE CAUSEY, OF ELECTRIC MILLS, MISSISSIPPI.

BAND SAW AND WHEEL THEREFOR.

Application filed December 8, 1926. Serial No. 153,237.

My invention relates to improvements in band saws and the means for mounting and driving the same.

In the commercial art band saws are mounted generally on two vertically separated pulleys, or as they are known in the trade, wheels, which wheels, in the larger types of band saws are of metal. The bottom wheel is usually the driving wheel while the top wheel is vertically movably relatively to the bottom wheel so as to place the saw under the desired strain to meet the requirements of different grades of wood, etc.

Heretofore in the commercial art extreme difficulty has been experienced in maintaining the saw on the wheels under varying conditions. Various means have been resorted to, in the construction and adjustment of the wheels, and in the construction and adjustment of the saws, to prevent the saw from running off the wheels when subjected to an undue strain in sawing and, in some instances, these have been successful, but where success has been attained in preventing the saw from running off the wheel other difficulties have been run into, namely that of the saw crystallizing at certain points thereby reducing materially the life of the saw. This crystallization I have found, is generally produced by vibration set up in the saw, due to its mounting, although there may be other causes that enter into this objection.

It is one of the objects of my invention to so mount a band saw that it will have a maximum of engaging surface in contact with the wheels, and that the points of engagement throughout the width of the saw shall be so distributed as to permit of the wheels being run on axes at right angles to the direction of travel of the saw and, to at the same time, insure a uniform strain upon the saw throughout its width.

For the purpose of disclosing my invention I have illustrated one embodiment thereof in the accompanying drawings in which Fig. 1 is an end elevation (more or less diagrammatical) of a band saw, embodying my invention, mounted on its wheels;

Fig. 2 is a sectional view thereof;

Fig. 3 is an enlarged sectional view of the saw and wheel rim, and

Fig. 4 is an exaggerated view similar to Fig. 3.

In the embodiment of my invention each wheel 1 is constructed in exactly the same manner so that it is only necessary to describe the construction of one wheel, it being understood however that in practice the driving wheel is usually of a heavier construction than that of the idle or top pulley, which is usually vertically adjustable relatively to the bottom wheel.

In describing my invention the dimensions and sizes have reference to a 14″ saw and to the wheels of a dimension to accommodate such a saw. It will be understood however that for different sizes of saws the specific dimensions given will be varied and that even in the specific size described variations may be made without departing from the spirit of the invention.

In constructing the saw 2 it is rolled longitudinally at points intermediate of its edges for the purpose of increasing the total length of the saw at these points. In the art this is known as tensioning the saw and in using a saw to embody my invention I preferably tension the saw, having reference to a 14″ saw, to give the greatest tension thereto at approximately the center of the width or at the point 3. In actual practice I have found that satisfactory results are obtained by having this greatest tension at a point 6¼ inches from the bottom of the gullet of the saw teeth. This tension is so formed in the saw that the saw is curved transversely on a 40 foot circle, as at 4, to the high point, that is from the gullet 5 of the teeth 6 to a point 6¼ inches towards the center. From this point the saw is curved on a 50 foot circle 7 from the high point 3 to within approximately one inch of the back edge 8 of the saw.

In Fig. 4 I have illustrated in an exaggerated manner the tensioning curve, as well as in an exaggerated manner the formation of the saw wheel and the manner in which the saw contacts therewith. The wheels 1 are particularly formed to receive a saw having the above described tension and, in practice, the periphery of the wheels are so ground that for a distance of ten inches from the front edge 9 of the wheel I form the periphery 10 of a predetermined diameter, this peripheral surface being preferably parallel with the axis of the wheel. For a distance of three inches from the rear edge 11 of the wheel the periphery is considerably reduced as at 12, which reduced portion is parallel with the axis of the wheel. At the juncture of the two dimensions of the periphery of the wheel there is formed a shoulder 13. In practice I have obtained satisfactory results by making the smaller diameter portion of the wheel $\frac{1}{16}$ of an inch smaller than that of the larger diameter. This would give a shoulder of $\frac{1}{32}$ of an inch.

When the saw and wheels are assembled it will be noted that due to the formation of the wheel and to the tensioning of the saw the saw is in contact with the wheel at three points 14, 15 and 16; the front edge of the saw, the point at 14, is in contact with the wheel for a slight distance from the front edge 9 of the wheel. Towards the rear of the wheel the saw is in contact with the large diameter portion of the wheel for a slight distance forward from the shoulder, at 15, and also, the saw is in contact with the wheel at the rear edge 11 and for a short distance inward therefrom, at 16. When the full strain is placed on the saw for sawing operations this strain is such that there is a tendency to stretch the saw in the shortest portions of its length, so that during the operation of the saw, with the usual upward stress imposed on the wheel, it is in effect contacting with the wheel throughout its width, with the greatest strain exerted at the three points 14, 15 and 16. During the operation of the saw the heating up of the front edge of the saw, due to the engagement of the teeth thereof with the material, will also tend to slightly elongate the saw at this point but due to the engagement under stress of the wheel therewith towards the front edge, this lengthening will not materially affect the engagement of the saw with the surface of the wheels. It will be also observed that if for any reason the rear edge of the saw becomes heated, due to loosening of the logs in the dogs of the mill, or to slivers coming in contact with the back of the saw, or for other reasons, the tendency of the saw at its back edge will be to increase in length due to the expansion of the metal. However, even if this should occur there is still a like stress contact with the wheel toward the back edge of the saw, at the point 16 and at the point 15 where the shoulder is formed in the periphery of the wheel. Therefore, there would be no tendency of the saw to ride off the wheel. Furthermore, due to the above arrangement I am enabled to maintain a sufficient strain on the saw at different points throughout its width to prevent vibration in the saw blade under varying conditions. Furthermore, the strain upon the saw is always in a straight line throughout the length of the saw, that is, the lines of strain are parallel with the edges of the saw or with the line of travel thereof.

It will be understood of course that modifications may be made in the tensioning of the saw as well as in the construction of the wheels without departing from the spirit of my invention.

I claim as my invention:

1. The combination with a centrally full tensioned band saw, of a supporting pulley therefor having the rear portion thereof slightly reduced in diameter and extending parallel to its axis, so as to bear upon and support the saw at its rear edge and also at a point a short distance removed from said rear edge, as well as adjacent the front edge but rearwardly of the teeth.

2. The combination with a centrally full tensioned band saw, of a supporting pulley therefor having its entire periphery parallel to its axis, but the rear portion thereof slightly reduced in diameter so as to bear upon and support the saw at its rear edge and also at a point a short distance removed from the said rear edge as well as adjacent the front edge but rearwardly of the teeth.

3. The combination with a centrally full tensioned band saw, of a supporting pulley therefor having the rear portion thereof slightly reduced in diameter and parallel with its axis, so as to bear upon and support the saw at its rear edge and also at a point a short distance removed from said rear edge, as well as adjacent the front edge but rearwardly of the teeth, the front end of the pulley and the point of reduction therein providing substantially radial faces at the lines of contact with the saw.

4. The combination with a centrally full tensioned band saw, of a supporting pulley therefor having its entire periphery parallel to its axis, but the rear portion thereof slightly reduced in diameter so as to bear upon and support the saw at its rear edge and also at a point a short distance removed from the said rear edge, as well as adjacent the front edge but rearwardly of the teeth, the front end of the pulley and the point of reduction therein providing substantially radial faces at the lines of contact with the saw.

5. The combination with a centrally full tensioned band saw, the tension of which from the center toward the front edge being greater than the tension from the center towards the rear edge, of a supporting pulley therefor having the rear portion thereof slightly reduced in diameter and extending parallel to its axis, so as to bear upon and support the saw at its rear edge and also at a point a short distance removed from said rear edge, as well as adjacent the front edge but rearwardly of the teeth.

6. The combination with a centrally full tensioned band saw, the tension of which from the center toward the front edge being greater than the tension from the center towards the rear edge, of a supporting pulley therefor having its entire periphery parallel to its axis but the rear portion thereof slightly reduced in diameter, so as to bear upon and support the saw at its rear edge and also at a point a short distance removed from the said rear edge, as well as adjacent the front edge but rearwardly of the teeth.

7. The combination with a centrally full tensioned band saw, the tension of which from the center toward the front edge being greater than the tension from the center towards the rear edge, of a supporting pulley therefor having the rear portion thereof slightly reduced in diameter and parallel with its axis, so as to bear upon and support the saw at its rear edge and also at a point a short distance removed from said rear edge as well as adjacent the front edge but rearwardly of the teeth, the front end of the pulley and the point of reduction therein providing substantially radial faces at the lines of contact with the saw.

8. The combination with a centrally full tensioned band saw, the tension of which from the center toward the front edge being greater than the tension from the center towards the rear edge, of a supporting pulley therefor having its entire periphery parallel to its axis, but the rear portion thereof slightly reduced in diameter so as to bear upon and support the saw at its rear edge and also at a point a short distance removed from the said rear edge as well as adjacent the front edge but rearwardly of the teeth, the front end of the pulley and the point of reduction therein providing substantially radial faces at the lines of contact with the saw.

In witness whereof, I, JOSEPH W. CAUSEY, have hereunto set my hand at Indianapolis, Indiana, this 29th day of October, A. D. one thousand nine hundred and twenty-six.

JOSEPH WALLACE CAUSEY.